Oct. 18, 1960  V. H. HASSELQUIST  2,956,615
STOCK STRIPPER FOR SPLICER HEADS
Filed April 17, 1958  4 Sheets-Sheet 1

INVENTOR.
VICTOR H. HASSELQUIST
BY
C. E. Tripp
ATTY.

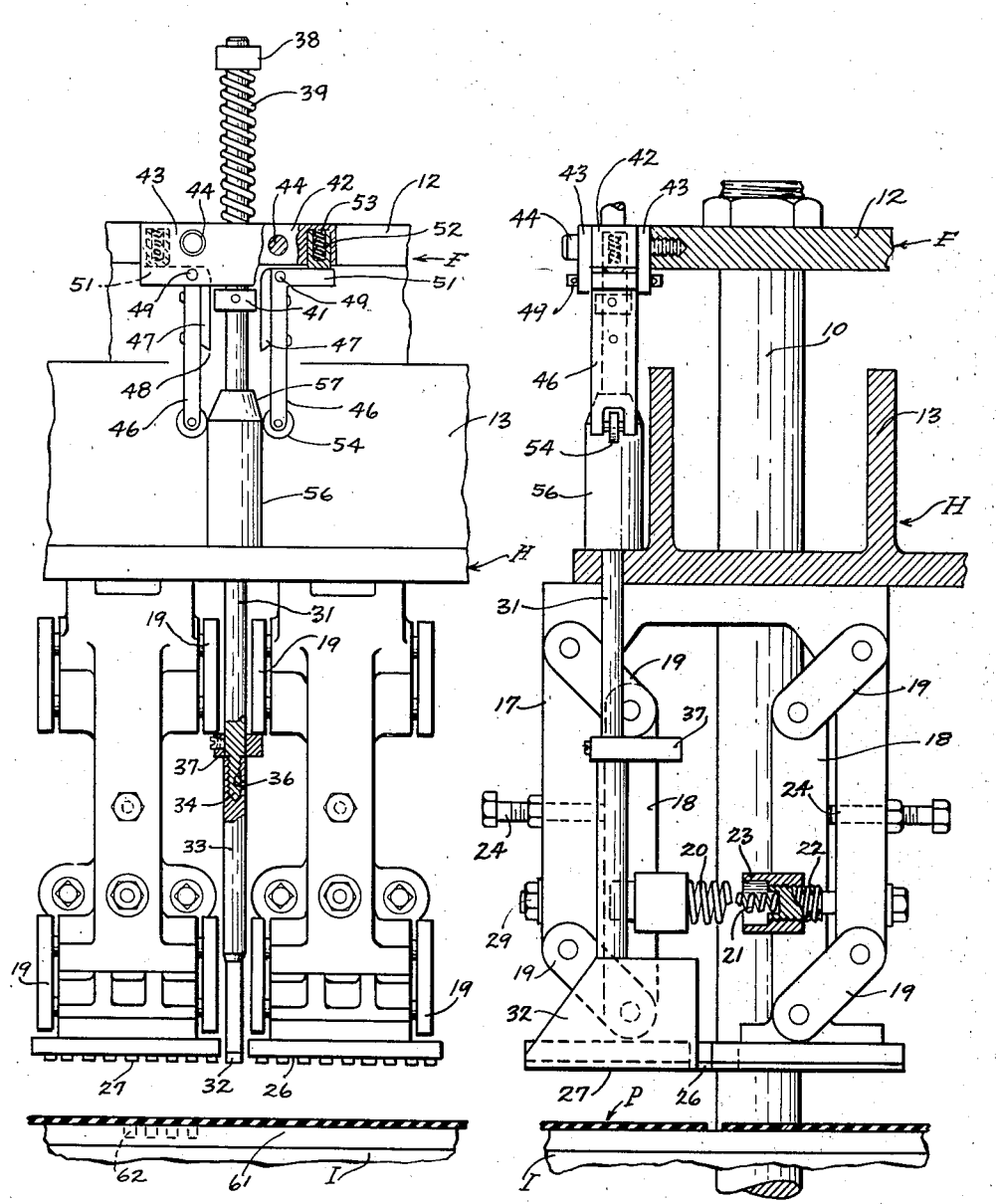

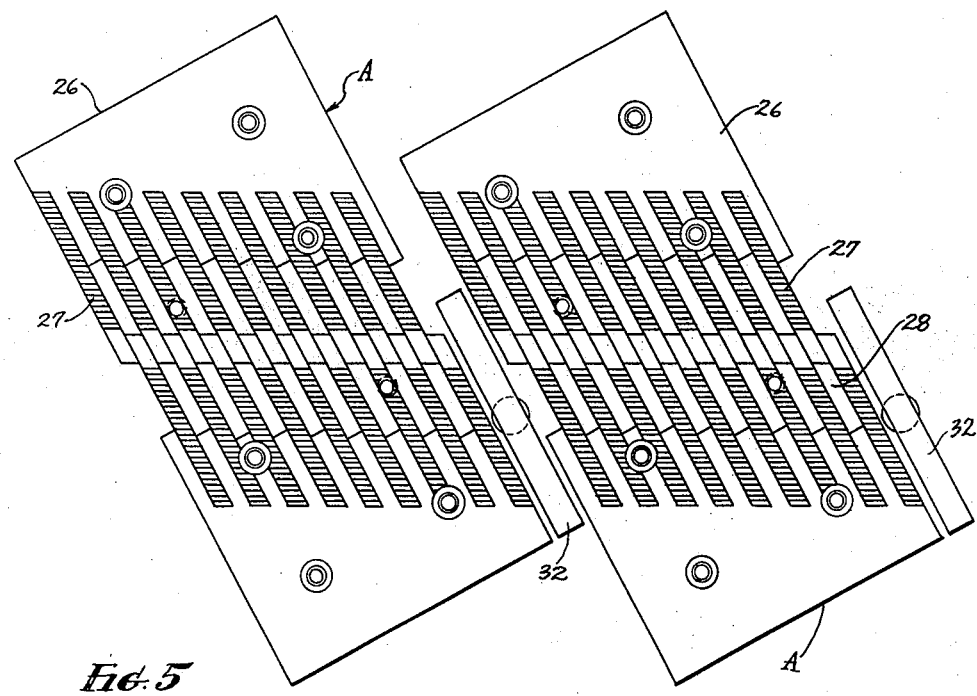
Fig. 5
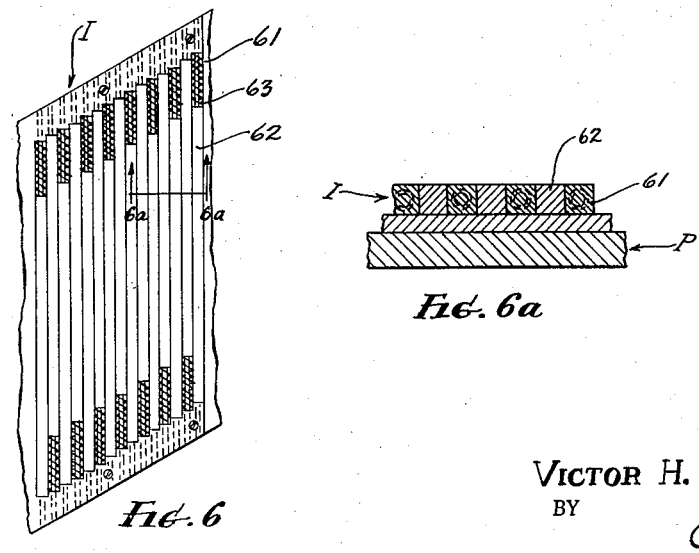
Fig. 6
Fig. 6a
INVENTOR.
VICTOR H. HASSELQUIST
BY
C. E. Tripp
ATTY.

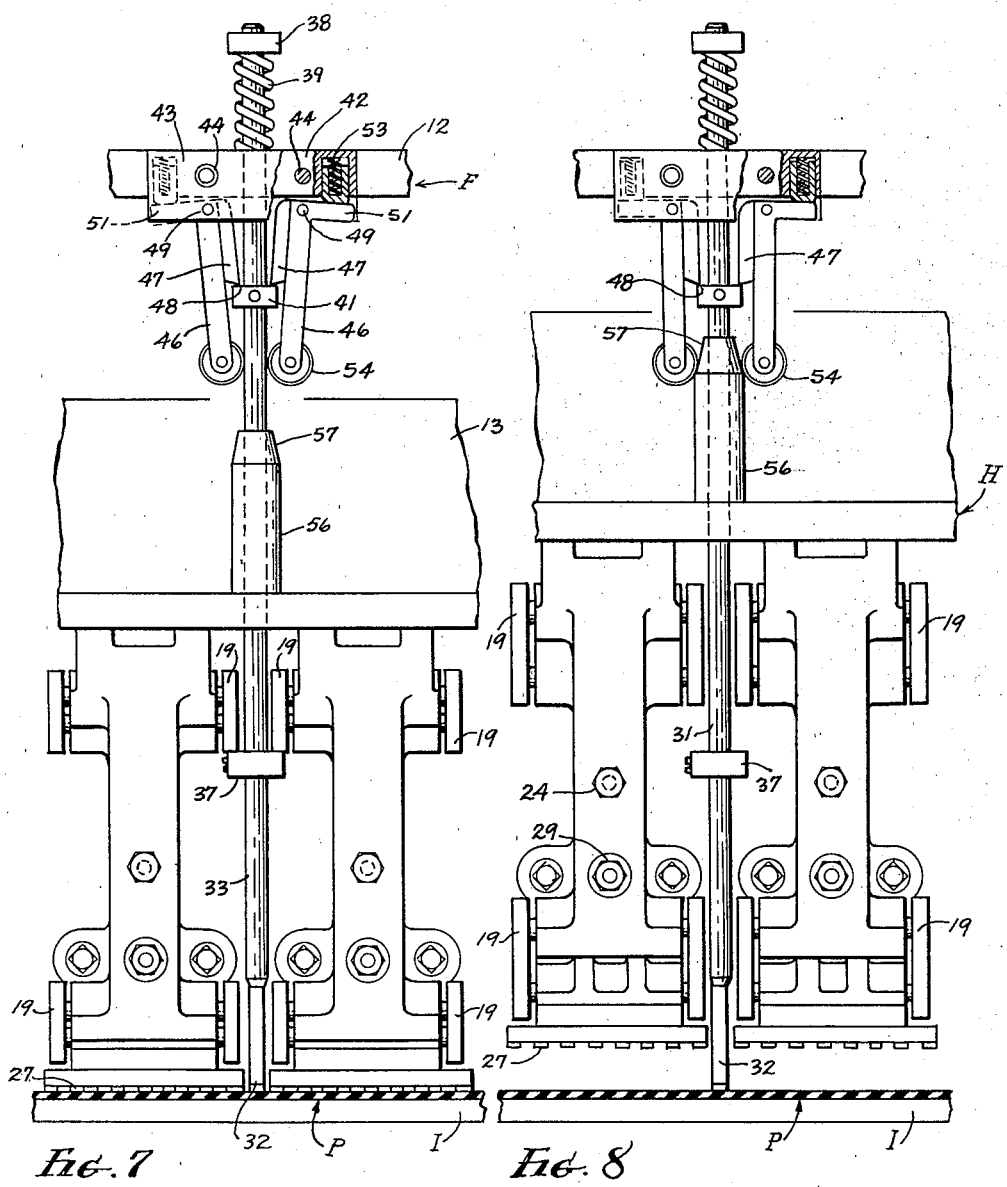

United States Patent Office 2,956,615
Patented Oct. 18, 1960

2,956,615

STOCK STRIPPER FOR SPLICER HEADS

Victor H. Hasselquist, Akron, Ohio, assignor to The B. F. Goodrich Company, New York, N.Y., a corporation of New York Filed Apr. 17, 1958, Ser. No. 729,117

1 Claim. (Cl. 154—42)

This invention relates to apparatus employed in the rubber industry for joining lengths of rubberized fabric material. It is particularly adapted for joining such material for use in the tire building art. In this art a wide sheet of cord fabric is passed between calender rolls and coated with tacky unvulcanized rubber. This sheet is then passed through a bias cutter wherein lengths of the tacky material are cut at a bias angle, the width of such lengths corresponding to the width of a tire ply. These bias cut lengths are next joined end to end in order to form a continuous length of ply stock for supplying the tire building apparatus, which continuous length of stock is later cut or separated into individual plies at the tire building drums. This invention relates to improvements in the apparatus that joins or splices the bias cut lengths of stock leaving the bias cutter. Certain specific details of the splicing apparatus itself are not part of the invention and hence only enough splicer structure will be disclosed to insure an understanding of the invention. A detailed and complete disclosure of a splicing apparatus for which this invention is adapted is found in my copending application, Serial No. 598,313, filed July 17, 1956, entitled "Butt Splicing Sheet Material."

In the operation of the apparatus of my copending application a difficulty which I sometimes encountered in dealing with certain kinds of very fresh tacky stock was that when the splicing head was retracted from the stock on the table, the retracting motion of the head was not rapid enough to snap the head and its splicing jaws free of the stock so that the stock tended to adhere to and rise with the retracting jaws. Such tacky stock frequently remained stuck to one set of splicing jaws or the other and would be stretched when the feed begins. In accordance with this invention a pressure foot is disposed along side of each splicing head and jaw assembly which foot engages the stock during splicing and, remains against the stock during most of the retract stroke of the splicer head. Near the end of the retract stroke, cam means on the splicer head unlatches the presser foot at each assembly and a spring quickly snaps each presser foot clear of the stock so that the take away conveyor can advance the spliced stock. The construction of apparatus embodying this invention will be apparent from the following detailed description of a preferred construction, taken along with the drawings.

In the drawings:

Fig. 3 is a side view of a pair of jaw assemblies with the presser foot assembly of the invention installed. For simplicity of illustration the plane of the mounting for the latch means of the presser foot assembly has been rotated to lie in the plane of the paper;

Fig. 4 is a section taken 90° from Fig. 3 at the presser foot assembly. In Figs. 3 and 4 the presser foot assembly is in its retracted position;

Fig. 5 is a bottom view of the splicing jaws and the presser feet;

Fig. 6 is a plan view of the inlay bars in the splicer table;

Fig. 6a is a section through the inlay bars taken on 6a—6a of Fig. 6;

Figure 1:
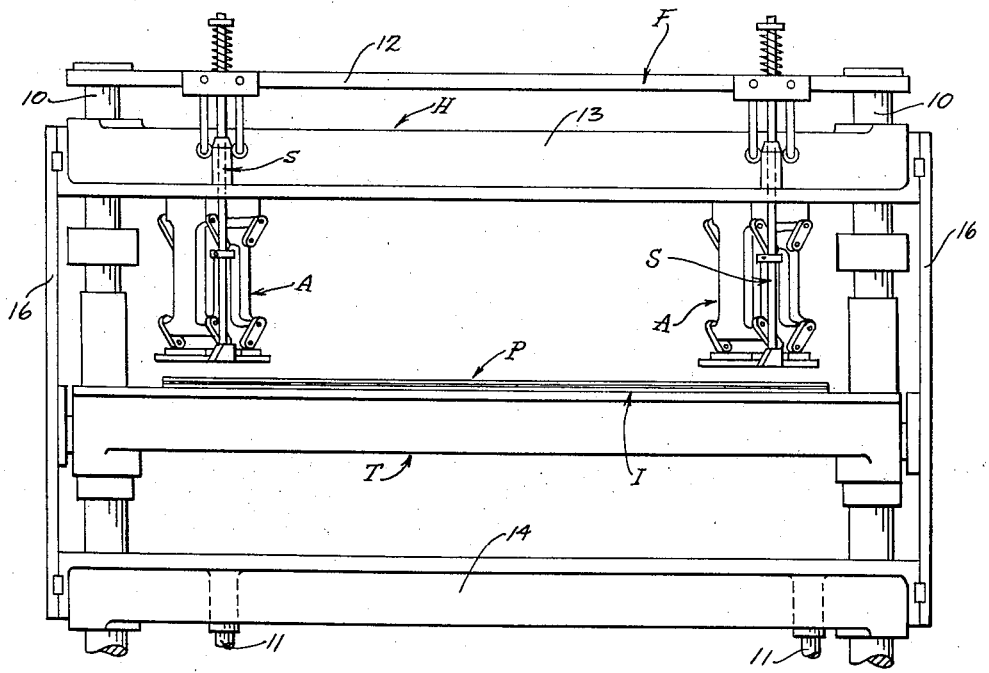
Fig. 1 is a side elevation of a splicing apparatus embodying the invention. Only two of the splicing head assemblies are shown.

Figure 7 is a view like that of Fig. 1 except that the splicing jaws have engaged the stock and the presser foot is latched against the stock; and Fig. 8 is a similar view except that the jaws of the splicing assembly have been retracted but the presser foot is shown in engagement with the stock. The apparatus is so disposed that the pressure foot is just on the verge of being unlatched so that it can quickly snap clear of the stock.

Figure 2:
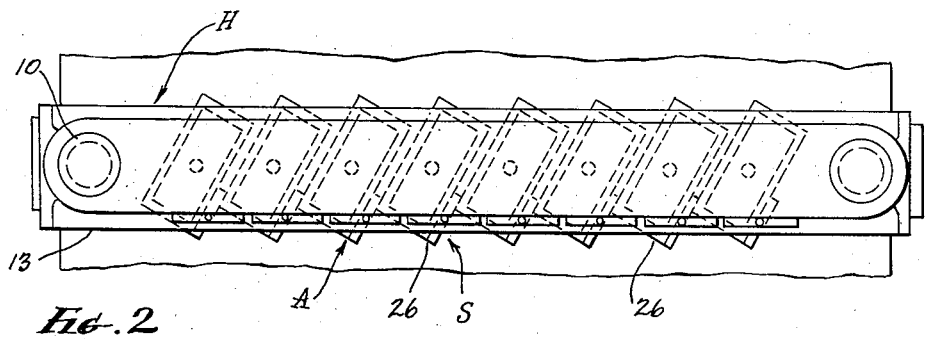
Fig. 2 is a plan view of the apparatus.

The general arrangement of the apparatus of this invention is shown in Figs. 1 and 2. The splicer includes a frame indicated generally at F that mounts a pair of parallel verticle guide rods 10 upon which a splicing head assembly H slides, this assembly being reciprocated toward and away from the table T by means of pistons (not shown) having rods 11 connected to the head. An inlay assembly I is built into the table. Mounted on the splicing head H is a row of splicing jaw assemblies A and the stripper assembly S is disposed at each jaw assembly. The lengths of stock being spliced are indicated at P. There is a tie plate 12 that bridges the upper ends of the guide rods 10. The splicing head assembly H includes a rigid cross beam 13 which supports the splicing and stripper assemblies. Also slidable on guide rods 10 is a lower guide bar 14 that is connected to the upper cross beam 13 by a pair of connecting side plates 16.

As best seen in Figs. 3 and 4 each splicer assembly includes a housing 17 and a pair of jaw support plates 18 pivotally mounted thereon by means of pairs of upper and lower links 19. The jaw supports are separated by a main retract spring 20 and an adjustable auxiliary retract spring 21, the compression of which is set by a threaded adjusting stud 22 threaded into a supporting ear 23. These springs urge the mounting plates 18 against adjustable stops 24 threaded into the housing 17. At the base of plates 18 are attached splicer jaws 26, a bottom view of which appears in Fig. 5. This view shows the serrated spaced projecting members 27 for engaging and splicing the stock and having portions that interfit and extend into opposing recesses 28. The lower portion of the body housing 17 is braced by a tie rod 29.

Referring to the stripper assembly construction, a vertical rod 31 mounts a stripper foot 32 which foot has an extension rod 33 that threadedly receives a stud 34 extending from the lower end of the main rod 31 and is threaded into a socket 36. A rod actuating collar 37 is adjustably mounted on the rod 31 for engagement by the upper pair of links 19 in order to press the presser foot against the stock.

On the presser rod 31 is an upper collar 38 that retains the main retract spring 39. In order to latch the presser foot against the stock a latch collar 41 is fastened to the rod for engagement with moveable latch bars. The latch bars are mounted in a block 42 between a pair of cover plates 43 bolted to the beam 12 by bolts 44. The latch arms 46 carry plates 47 formed with sharp edges 48 for engaging the collar 41. The arms 46 are of bell crank form and are pivoted between plates 43 by means of pins 49. The latch arms have crank extensions 51 engaging plungers 52 in block 42 backed up by springs 53 which arrangement urges the latch arms toward the latch position. The lower ends of the latch arms carry release rollers 54 that are actuated by a cam 56 mounted on the rod 31, the cam having a conical latch release surface 57. This completes the structure of a presser foot assembly.

As disclosed in my aforesaid application the table has an inlay plate 61 carrying slidable bars 62 urged to the neutral position by springs 63. These bars overlie the presser jaws teeth 27 and the cooperation of the jaws and inlay bars is explained in my aforesaid application.

In operation Figs. 3 and 4 show the splicing head in its retracted position with the splicing jaws and the presser foot clear of the stock and with the latch released by cam 56. Also, as seen in Fig. 4 the springs 20 and 21 have spread the splicing jaws so that their support plates 18 engage the stop screws 24.

When the splicing head assembly descends, the splicing jaws engage the stock as seen in Fig. 7, and due to the toggle action of links 19 the jaws are brought together laterally to make the splice, this motion being resisted by the force of springs 20 and 21. At this time latch collar 41 just clears the sharp edges of latch plates 47 and the cam is disposed to cause plungers 52 to engage the latch. After completion of splicing action, the splicing head assembly retracts. During initial retraction the jaws are spread laterally apart again by their springs until plates 18 again engage stop screws 24. There will be some pressure of the jaws on the stock during this phase of operation but it will be much less than pressure developed on the down stroke because the tendency is to move the jaws away from the stock. The presser feet being disposed against the stock to prevent action of the jaws from opening up the splice.

Fig. 8 shows the assembly in a retracted position with the splicing jaws lifted clear of the stock and the presser foot still in place against the stock. The position shown here is one where latch collar 41 is just about to be freed by the action of cam surface 57 acting on latch rollers 54. Further retraction of the head unlatches the presser rod 31 and retract spring 39 quickly snaps the presser foot clear of the stock without danger of lifting the stock from the table. The take off conveyor can now be actuated to bring a new length of stock in place for the next splice. The snap retract action of the presser rod is limited by engagement of collar 37 with a pair of links 19 that mount the jaws, as seen in Figs. 3 and 4.

As a result of this invention splices, including butt splices, of relatively tacky rubber coated cord stock can be made consistently and uniformly without danger of stretching the stock due to its sticking to splicing jaws coupled with a new feed cycle.

Having completed the detailed description of the preferred embodiments of the invention so that others skilled in the art may practice the same, I claim:

In an apparatus for splicing sheet material which apparatus includes a stock table and a splicing head mounted on a frame for motion toward the table to engage stock thereon and for retraction motion away from the table, the splicing head including opposed jaws movable relative to the table in engagement with the stock during a substantial portion of the motion of the splicing head toward and away from the table, the improvement comprising a support fixed relative to the table, a rod reciprocable in said support toward and away from the table and also extending through and reciprocable relative to said frame, a presser foot on said rod, means biasing said rod relative to said support to urge said presser foot away from the table, means for engaging said rod with said splicing head so that said splicing head displaces said presser foot against stock on the table as said splicing head is moved by said frame toward the table, means carried on said support for latching said rod in its position in which said presser foot is in engagement with the stock, and means carried on said frame for unlatching said presser foot to effect retraction of said presser foot when said frame has moved said splicing head and the jaws thereon to a predetermined position away from said stock on the table.

References Cited in the file of this patent

UNITED STATES PATENTS

| 2,395,387 | Fry | Feb. 26, 1946 |
| 2,638,964 | Andina | May 19, 1953 |

FOREIGN PATENTS

| 86,286 | Netherlands | Aug. 16, 1957 |